June 3, 1941.  A. K. ANTONSEN ET AL  2,244,323
INTERNAL COMBUSTION ENGINE
Filed Dec. 30, 1938  3 Sheets-Sheet 3
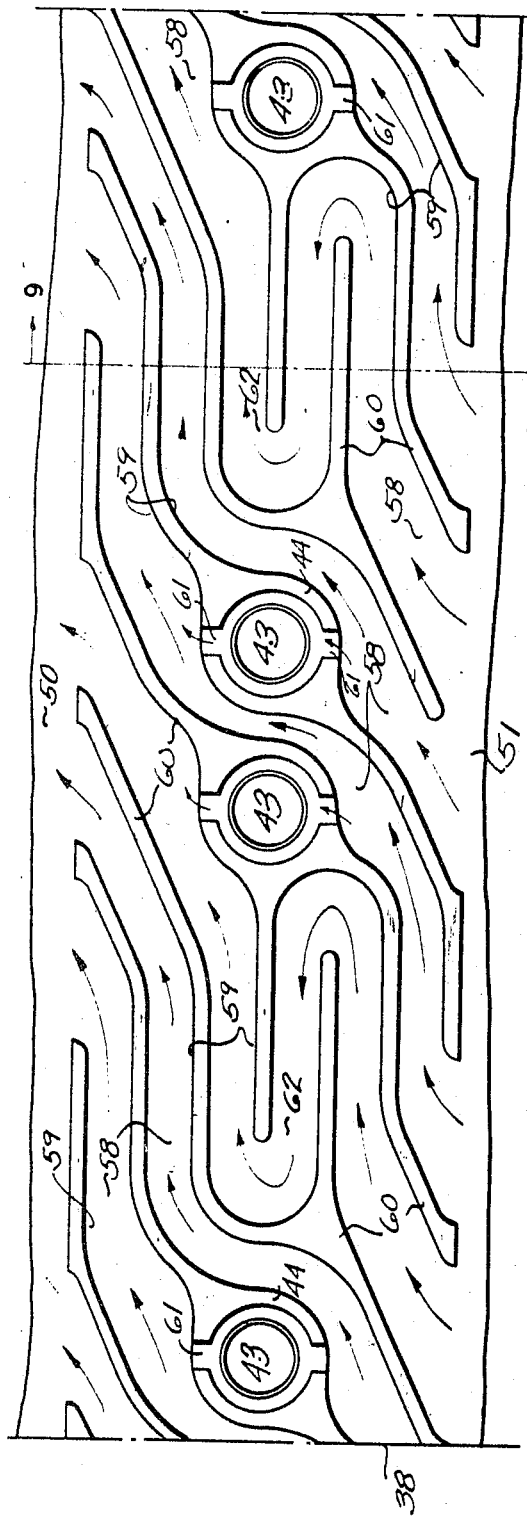
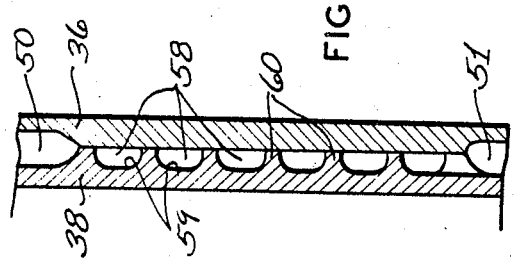
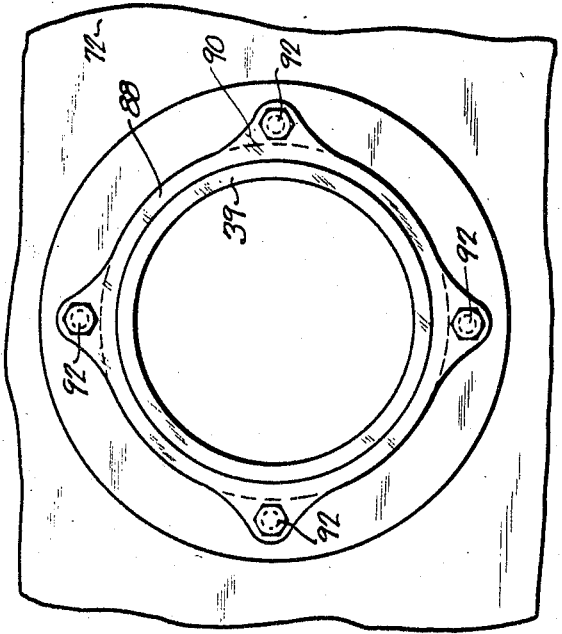
INVENTORS
HANS DAVIDS
ANKER K. ANTONSEN
BY
ATTORNEY Patented June 3, 1941

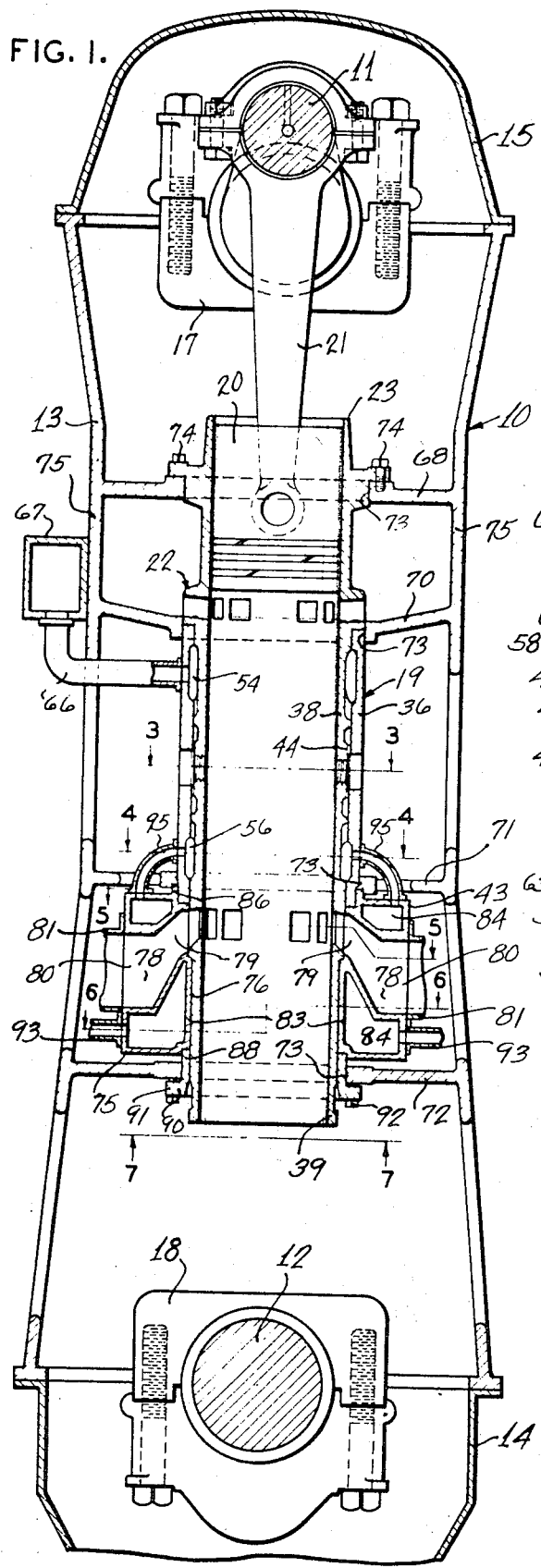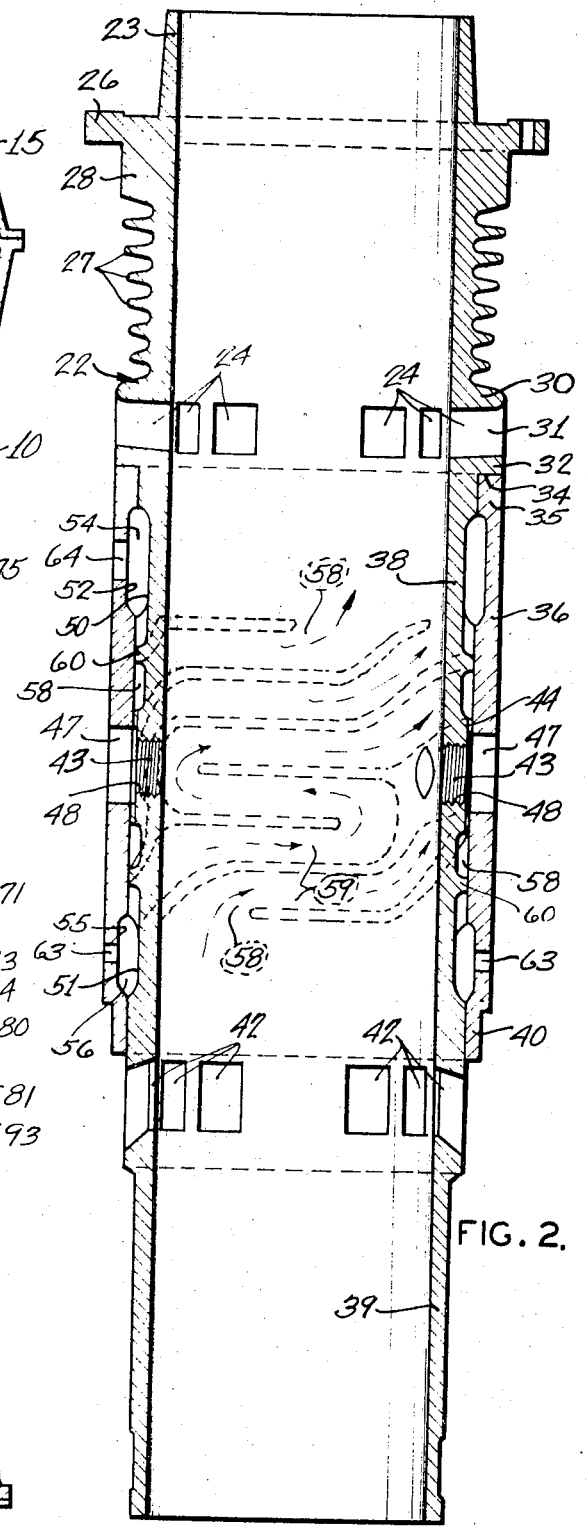

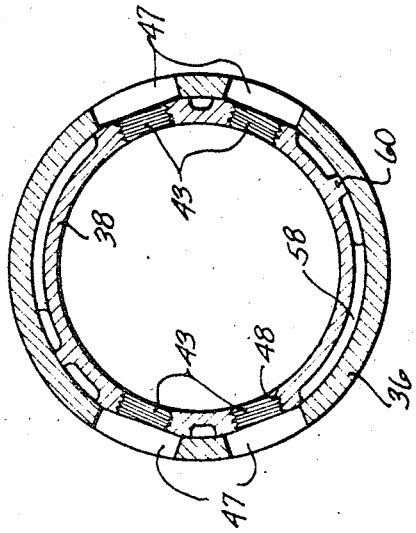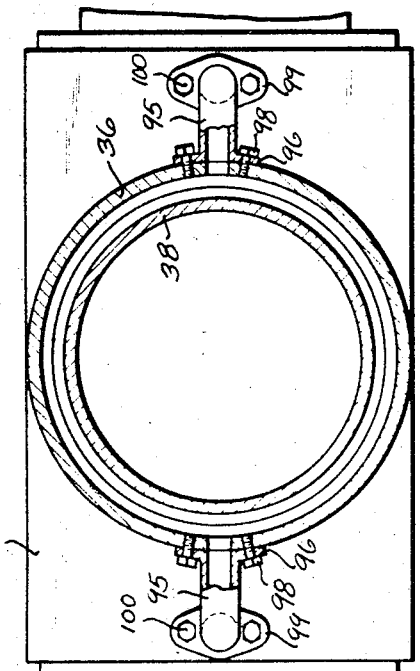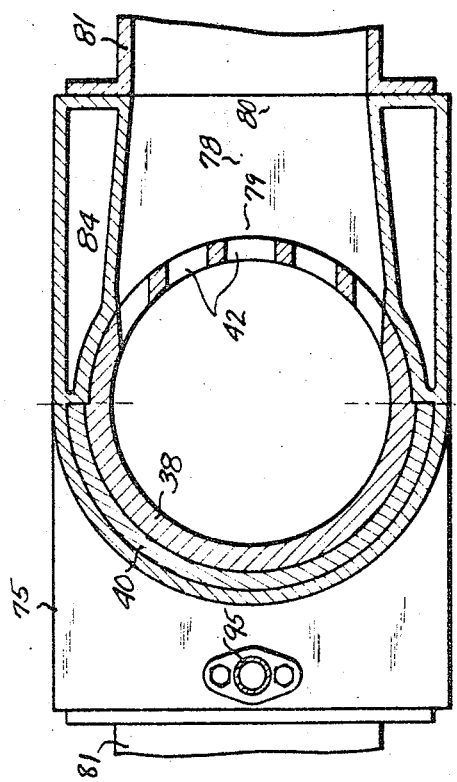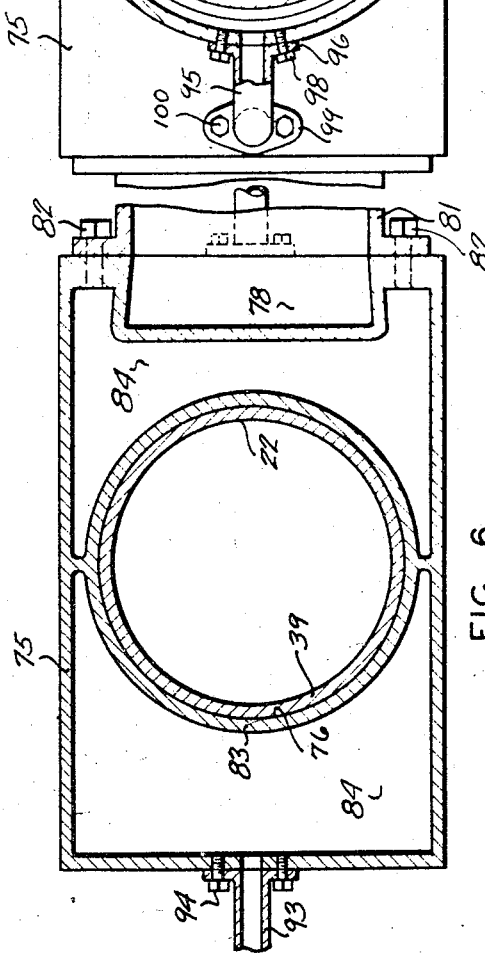

2,244,323

UNITED STATES PATENT OFFICE 2,244,323

INTERNAL COMBUSTION ENGINE

Anker K. Antonsen, Cedar Falls, Iowa, and Hans Davids, Beloit, Wis., assignors to Fairbanks, Morse & Co., Chicago, Ill., a corporation of Illinois Application December 30, 1938, Serial No. 248,434

18 Claims. (Cl. 123—173)

This invention relates to internal combustion engines and more particularly to improvements in the structure and assembly of cylinders for Diesel engines of the opposed-piston, solid injection type characterized by upper and lower crank shafts, and to an improved method of cooling such cylinders.

An object of the invention is to provide an improved cylinder structure for engines of the type noted, comprised of a liner and sleeve assembly removably secured together to form a cylinder unit, the unit being adapted for a so-called "slip-fit" assembly to the engine frame or block, whereby the liner assembly may readily expand relative to the engine frame; the provision for liner expansion serving to prevent a binding of the liner in the frame and by reason thereof, to prevent scoring of the liner during engine operation.

Another object resides in the provision of an improved cylinder unit comprised of a liner and sleeve assembly as indicated, wherein the sleeve cooperates with the liner to provide a waterjacket about the liner combustion zone for water-cooling such zone, the jacket passages being arranged in substantially spiral and reversed trends circumferentially of the liner over the combustion zone thereof, whereby to attain a more effective distribution of the cooling water about the liner, and as a result thereof, a marked increase in the cooling efficiency of the jacket. Further, the passages are of relatively shallow depth and of such water-flow capacity as to effect a relatively high velocity water circulation therethrough, whereby among other advantageous effects thereof, steam and vapor bubbles forming in the passages and tending to adhere to the passage surfaces, may be readily and quickly carried away in the high velocity water flow. Thus air or steam pockets forming in the jacket passages which, if allowed to remain, would seriously impair the cooling efficiency of the jacket system, are effectively prevented.

A further object is attained by the provision of a cylinder unit as noted, which is adapted to be effectively cooled at the scavenging-air inlet port zone thereof by suitable cooling means located adjacent such zone; directly water-cooled about the combustion zone thereof, and indirectly water-cooled about the exhaust port zone of the cylinder.

A still further object resides in the provision of an improved cylinder assembly providing a water-cooling jacket about the combustion zone thereof, wherein the cooling water does not flow over or contact any frame element of the engine block by which the cylinder assembly is carried; hence rusting of the cylinder in the engine block is precluded.

Yet another object lies in the provision of a cylinder assembly as noted, including a cylinder liner and sleeve element cooperating therewith in forming a water jacket about the liner combustion zone, wherein the construction of the jacket is such as to obviate any need for leak-preventing gaskets in association therewith, in the assembly of the cylinder to the engine frame, and further, wherein the jacket construction is such that it may be completely leak-tested before mounting of the cylinder to the engine frame, thus obviating leak-testing thereof after assembly to the engine.

Further objects and advantages will readily appear from the following description of the invention, when read in connection with the accompanying drawings, in which:

Fig. 1 is a vertical section taken transversely through an internal combustion engine, particularly through a cylinder thereof, the engine being of opposed piston type characterized by upper and lower crankshafts and embodying in the cylinder structure and its structural relation to the engine frame, the features and improvements constituting the present invention; Fig. 2 is an enlarged transverse section taken longitudinally, of the improved cylinder liner structure embodied in the engine of Fig. 1, this view however, illustrating cooling fins on the liner adjacent the air ports therein; Figs. 3, 4, 5 and 6 are enlarged horizontal transverse sections of the cylinder assembly as viewed respectively from lines 3—3, 4—4, 5—5 and 6—6 in Fig. 1; Fig. 7 is an enlarged view looking upwardly at the lower end of the cylinder liner, as taken from line 7—7 in Fig. 1; Fig. 8 is an enlarged developed view of the water jacket zone of the cylinder liner structure, illustrating the spiral and reversed water passages formed in the outer surface of the liner, and Fig. 9 is a section through the liner wall and related liner sleeve at the jacket zone, as taken from line 9—9 in Fig. 8.

Referring to the drawings by suitable numerals of reference, there is illustrated by Fig. 1 an internal combustion engine 10 of Diesel, opposed piston type characterized by upper and lower crankshafts 11 and 12 respectively, the engine shown being of either single or multi-cylinder type. The view of Fig. 1 as will be observed, is a vertical transverse section taken through a cylinder of the engine. The numeral 13 denotes generally, the engine frame which includes lower crank case 14 and upper crank cover 15, while at 17 and 18 are shown respective bearing assemblies for the upper and lower crankshafts. A cylinder assembly indicated generally at 19, arranged so that its longitudinal axis is vertical and intersects the axes of the crankshafts, is supported by the engine frame in a preferred manner hereinafter appearing. The structure of cylinder 19 and its assembly arrangement in the engine frame constitute important elements of the present invention, and since the features and improvements thereof apply equally to each cylinder of a multi-cylinder engine, a full description hereinafter of the single cylinder 19 illustrated in the drawing, will suffice for each of the others. For a purpose later to be described in connection with the improved method of cooling the cylinder structure, the upper piston denoted generally by the numeral 20 is shown in the assembly view of Fig. 1, the piston being operatively connected to the upper crankshaft 11 by a suitable connecting rod 21. According to well known practice, the piston 20 is by preference, oil cooled in a suitable manner (not shown). It may be noted that the lower piston (not shown) may be similar to piston 20 in type and structure.

Fig. 2 provides an enlarged view of the cylinder structure 19 shown in the assembly view of Fig. 1. However, the structure of Fig. 2 is modified to show air-cooling fins adjacent the upper end of the cylinder, while the cylinder of Fig. 1 is devoid of such fins. In all other respects the cylinder structures of Figs. 1 and 2 are the same. Referring to Fig. 2, the cylinder 19 includes a liner 22 preferably of cast iron construction, the liner providing a cylindrical guide for a pair of pistons (only the upper one 20 of which is shown) reciprocably operable therein in opposed relation, the pistons being operably connected in a suitable manner as by connecting rods, to the upper and lower crankshafts. Inwardly of its upper end 23, the liner is provided with scavenging air inlet ports 24 arranged circumferentially of the liner. Adjacent the end 23 and projecting outwardly of the liner is a substantially circumferential projection or flange 26 which serves as a liner mounting expedient as will hereinafter appear. Between the mounting flange and the air port zone of the liner (Fig. 2) are a plurality of liner cooling projections or fins 27 which extend substantially about the liner, the fins which are preferably cast integrally with the liner, terminating in an annular boss 28 beneath the flange 26. As will later appear, the boss 28 and flange 26 cooperate as positioning and mounting expedients for the liner structure. The manner in which the upper end of the liner is cooled, through the instrumentality of the fins 27 thereon, in the liner of Fig. 2, and through the oil-cooled upper piston 20 (Fig. 1) in the case of the liner of Fig. 1 which is shown without fins on its upper portion, will be described fully hereinafter.

As appears in Fig. 2, the liner wall portion 30 at the zone of the air ports 24 is of thickened section, corresponding substantially to the annular boss 28 above described. Port passages 31 are formed in and extend laterally through this wall portion, opening exteriorly of the wall section for communication with scavenging air supply means later to be noted. The thickened wall portion 30 cooperates with the lower adjacent portion 32 of the liner to provide an annular, shouldered seat 34 to receive the upper end portion 35 of a cylindrical member 36 which is sleeved on the mid-section 38 of the liner. Member 36 is by preference, formed from suitable steel stock and is adapted for a press-fit assembly to the liner section 38, being slipped over the liner from the lower end 39 thereof until the end 35 of the member abuts the shouldered seat 34. The longitudinal or axial extent of the sleeve member 36 is such that in assembly with the liner, the lower end 40 thereof is disposed adjacently above suitable exhaust ports 42 formed in the liner inwardly of its lower end 39.

In forming the liner, oppositely arranged diametrically aligned apertures 43 are provided through the liner wall in a zone which is substantially mid-way of the liner ends. For this purpose, suitable bosses 44 are formed on the liner periphery, through which the apertures extend. In radial alignment with each of the liner apertures 43 is an aperture 47 formed in the sleeve member 36, the sleeve apertures by reason of the assembly location of the sleeve relative to the liner and its apertures 43, being located substantially mid-way between the sleeve ends (Fig. 2). In the present example and as shown particularly by Fig. 3, there are four such cooperating liner and sleeve apertures, two on each side and in diametrically opposed relation. Two of the diametrically registering sleeve and liner apertures are provided for the reception of suitable fuel injection nozzle devices (not shown), while the remaining two may be utilized to receive suitable combustion test instruments, as pressure responsive devices (also not shown). As an assembly expedient for the fuel nozzles and testing devices, one or both of the cooperating sleeve and liner apertures in each case, may be tapped and threaded, as shown at 48 in respect to the liner apertures 43.

An annular groove or channel 50 is formed in the periphery of the liner adjacent to and below the air ports 24, while a similar channel 51 is provided adjacently above the exhaust ports 42. An annular channel 52 formed internally of the sleeve end 35 cooperates in the assembly of the sleeve and liner, with the liner channel 50 to form a jacket chamber or passage 54 for engine cooling water. Similarly, a channel 55 internally of the lower end of the sleeve 36, cooperates with the lower liner channel 51 to form a jacket chamber 56 for engine cooling water. The upper and lower jacket chambers thus provided, are connected by a plurality of passages, designated generally by the numeral 58, and formed in part by channels 59 in the periphery of the liner mid-section 38 (Figs. 2, 8 and 9). Fig. 8 shows the liner mid-section 38 in developed elevation, whereby more clearly to illustrate the preferred trend of the channels 59. The channels are formed by wall projections or partitions 60 which are preferably provided for in the casting of the liner, the partitions being arranged in a predetermined manner to give to the channels formed thereby a tortuous trend in a direction somewhat spirally of the liner axis, as clearly shown by Fig. 8. It will be observed that certain of the channel-forming partitions are disposed to give a substantially reversed trend to some of the channels, as the channels 62. All of the channels 59 are open to the upper and lower peripheral channels 50 and 51 in the liner, as clearly appears in Figs. 2 and 8.

The channels 59 are closed peripherally of the liner, by the tubular sleeve 36 as shown in Figs.

2 and 9. As before indicated, the sleeve 36 is adapted for assembly to the liner by a press-fit thereon, the engaging surfaces of the sleeve and liner being by preference, machined for this purpose. By reason of the press-fit, a water-tight jacket may be obtained without the use of gaskets or the like. The elimination of gaskets in the liner jacket assembly constitutes an important feature of the present invention, as will be readily appreciated. Thus in assembly, the sleeve cooperates with the liner in forming upper and lower jacket chambers 54 and 56, as heretofore described, and tortuous, spirally arranged passages 58 interconnecting the chambers, the passages and chambers forming a jacket system about the mid-section of the liner, through which is circulated engine cooling water. Since the liner mid-section 38 defines the cylinder combustion zone, the jacket chambers and passages thereabout through which cooling water is circulated, provide a cooling means for the combustion zone.

It will be noted in Fig. 8 that channels 61 are provided in opposite peripheral portions of each of the liner bosses 44, each channel 61 being in communication with an adjacent jacket channel 58. Although not shown, channels 61 in each boss 44 communicate with a jacket chamber (not shown) extending about the fuel injector nozzle or testing instrument (not shown) located at such bossed portion. As will be observed, these channels 61 serve to by-pass some of the liner cooling water circulated through the liner jacket, to and about say the injection nozzles, for cooling the same. Although the structural details of such by-pass cooling of the injection nozzles and testing instruments are not shown in the present case, except for the channels 61, such forms the subject matter of a copending application by Hans Davids, filed December 30, 1938, and bearing Serial No. 248,435.

As compared to the older prevailing axially extended jacket passages at the liner combustion zone, the above described angulate passages which are directed somewhat spirally of the liner periphery, serve effectively to prevent a so-called short-circuiting of the water flow therethrough. The improved jacket arrangement also provides a longer path for water circulation and hence a greater distribution of the cooling water about the combustion zone. These two features contribute materially to the attainment of a more uniform and more efficient liner cooling. As a further feature of the jacket arrangement, it will appear that the channel-forming projections 60 extending angularly and spirally about the liner periphery of the combustion zone thereof, serve effectively as liner strengthening ribs to counteract the stresses set up in the liner during fuel combustion periods in the operation of the engine.

A further and distinct feature of the improved jacket system is to be found in the formation of the jacket passages, in that these passages are of relatively shallow depth and so adapted in sectional area as to effect a relatively uniform and high velocity rate of water flow therethrough. The high velocity water circulation at a substantially uniform rate of flow through the jacket passages, thus serves most effectively, to carry off the heat of combustion transmitted to the cooling water through the liner walls. In addition, the high velocity water circulation through the jacket serves to prevent the formation of air or stream pockets in the jacket passages, as all steam or vapor bubbles forming therein and tending to adhere to the passage surfaces, will be quickly and effectively swept away in the water flow.

The jacket structure above described is substantially an integral part of the cylinder assembly, being independent of the engine block or frame as will be readily appreciated. Hence in the assembly of the cylinder to the engine frame, the cylinder cannot become rusted in, as often happens in the older prevailing arrangements wherein the jacket is formed in part by the liner and in part by adjacent portions of the engine frame. A further advantage attained by the presently improved arrangement wherein the jacket is an integral part of the cylinder, is that the jacket may be completely leak-tested prior to mounting of the cylinder assembly in the engine frame. Thus is made possible a more positive assurance against leakage. Moreover, as a direct result of forming the liner jacket in the manner described, as an integral part of the cylinder structure, wholly apart from any element of the engine frame or block structure, the need for leak-preventing gaskets in the liner and sleeve assembly is obviated.

Engine cooling water is admitted to the jacket system through openings 63 in the lower end portion of the sleeve 36, there being by preference, two such openings in the present example, arranged substantially diametrically opposite each other, as in Fig. 2. These openings communicate directly with the lower jacket chamber 56. The cooling water is discharged from the jackets preferably through a single opening 64 in the upper end of the sleeve 36, the discharge opening by preference having a sectional area substantially equal to the combined sectional areas of the inlet openings 63. As shown in Fig. 1, a suitable pipe 66 connects the jacket outlet 64 to a return conduit 67 carried by the engine frame, the return conduit by preference extending the length of the engine and serving as a common return for the jackets of all of the engine cylinders. The engine cooling water is conducted from a source (not shown) to the inlet openings 63 through means presently to be indicated.

The cylinder comprising the liner and sleeve assembly is positioned in assembly to the engine frame by upper, vertically spaced frame members 68 and 70, and lower, vertically spaced frame members 71 and 72, each providing a circular opening 73 to receive the liner. In final assembly position, the boss 28 on the liner seats in opening 73 of member 68, while the liner flange 26 engages the said member and is secured thereto by suitable bolts 74 (Fig. 1). It is to be noted as a distinct feature of the liner assembly to the engine frame, that the liner structure and frame openings 73 are adapted to provide for a slip-fit of the liner in said openings, whereby the liner may readily expand during engine operation, so as to prevent binding of the liner in the frame, this resulting in a substantial elimination of scoring of the liner cylinder surface. Moreover, the slip-fit attained, serves to provide for a ready and easy liner removal, as will be readily appreciated.

The upper frame members 68 and 70 cooperate with the engine frame side portions 75 to provide conduits through which scavenging air may be delivered from a suitable source (not shown) to the liner air ports 24. The air conduits preferably extend horizontally along the length of the engine on either side of the cylinders (only one cylinder being shown in Fig. 1), and are common to the air ports of all the cylinders. As clearly appears in Fig. 1, the liner end section between the bosses 28 and 30 is directly exposed to the air flow in the conduits, whereby a part of the heat of combustion conducted to such portion of the liner will be absorbed by the scavenging air flowing under pressure and at a relatively high velocity about said liner section. Where it is desired to increase the rate of heat transfer from the described liner section to the scavenging air flowing thereabout, the liner may be provided with projections or fins such as those illustrated at 27 in the liner of Fig. 2, these fins being directly exposed to the scavenging air flow in the conduits and hence serving to increase the heat-exchange surface of the liner section. Where, as in the illustration of Fig. 1, the liner section above referred to is devoid of air-cooling fins, the heat of combustion transmitted to such section will be in great part, transferred to the upper piston 20 and thence carried away in the oil circulating in the oil cooling system of the piston. Thus in either instance, the upper section of the liner will be effectively cooled throughout engine operation.

The above described method of cooling the upper section of the liner presents a distinct advantage over prevailing designs which utilize water-cooling through jackets at this zone. There being no water jackets and water supply connections at such zone, the problem of water leakage into the air conduits and air ports, followed by absorption thereof in the scavenging air flow, is entirely obviated. Thus from the foregoing description, it will be observed that the upper end 23 of the liner is effectively cooled without the use of a water jacket cooling system at such zone, while the combustion zone of the liner is directly water cooled through the described jacket system thereabout. The lower end of the liner substantially at the zone of the exhaust ports, is less directly water cooled by means presently to be described.

A cast, jacketed exhaust collector member 75 substantially of the form shown in Figs. 1, 5 and 6, is sleeved upon the lower end of the liner, about the exhaust ports. The structural details of the collector member and its assembly relation to the liner and to exhaust manifolds form the subject of a copending application by Hans Davids, Serial No. 197,648, filed March 23, 1938, and assigned to Fairbanks, Morse & Co. Accordingly, for purposes of the present invention, only a brief description thereof will be presented to illustrate its functional cooperation with the present improved liner assembly, particularly in respect to its function in the cooling of the liner exhaust port zone. The collector member is formed to provide a central, circular opening 76 of a dimension to receive the lower end portion of the liner, and is formed further to provide diametrically opposite passages 78 of somewhat angulate extent as shown, the inner ends 79 of which register with the liner exhaust ports 42 (Figs. 1 and 5). The outer ends 80 of the passages communicate with exhaust manifolds, only portions 81 of which are shown (Fig. 1). The manifolds which preferably extend the length of the engine on either side thereof and are common to the collector members of all the cylinders, are suitably supported by the engine frame or the collector members, preferably the latter as by assembly bolts 82 (Fig. 6). The inner wall 83 of the collector member, which defines in part, the jacket spaces 84 about the passages 78, and which further defines the liner-receiving opening 76, is in metal-to-metal contact with the lower end of the liner. Thus the heat of combustion and heat from the exhaust gases passing through the ports 42, will be conducted through the metal of the lower liner end to the wall 83 of the collector member, thence to the engine cooling water circulated through the collector jacket spaces 84.

Assembly of the collector member to the liner may be accomplished by first inserting the collector laterally between the frame members 71 and 72, into a position such that the axis of its central opening 76 is in register with the axis of the liner, and then displacing the liner downwardly so that its lower end passes therethrough. After which the collector member is upwardly displaced to and maintained in assembly position such that its upper end portion 86 engages the frame member 71 in the manner shown by Fig. 1, by a ring 88 engaging the lower end 90 of the member and secured to the frame member 72 (Figs. 1 and 7), through a ring flange 91 and suitable bolts 92. In the described assembled position of the jacketed, exhaust collector member, the passages 78 in the member will be in complete register with the exhaust ports 42, as shown in Fig. 1.

From a source (not shown) of engine cooling water under suitable pressure, the water is conducted through pipes 93 to the lower portion of the collector jacket spaces 84, each pipe being suitably connected to the collector member as by bolts 94 (Fig. 6). The water circulates through these jacket spaces and thence is conducted through suitable pipes 95 to the liner jacket inlets 63 in sleeve 36. As shown in Fig. 4, each pipe 95 is provided with a flange 96 at one end by which it is connected to the sleeve 36, as by suitable bolts 98. A flange 99 at the opposite end of the pipe serves as a securing element by which the pipe end may be connected to the collector member 75, as by bolts 100. Suitable gaskets (not shown) may be utilized at all pipe connections to insure against water-leakage at such points.

From the foregoing description, it will now appear that an improved cylinder is provided, comprising a liner and sleeve assembly wherein the sleeve cooperates with the liner to provide a self-contained cooling water jacket about the combustion zone of the cylinder. The described method of cooling the cylinder is based upon the several sections of the cylinder which are subjected to differing degrees of heat during engine operation. The combustion zone is of course, subjected to the greatest degree of heat, the exhaust port zone only slightly less so, and the scavenging air port zone to a considerably lesser degree. With this in view, the more effective water cooling is utilized in the hottest zones, while less effective cooling means is employed for cooling the cylinder zone subjected to a lesser degree of heat, as the air port zone thereof. Accordingly, the structure of the cylinder and its assembly relation to the engine frame, air supply ducts and water-cooled exhaust collector member, are such as to attain a proper degree of cooling of the upper cylinder portion at the zone of the air ports, effected through liner fins exposed to the scavenging air flow, through the oil-cooled upper piston, or by a combination of these two cooling means; direct water-cooling about the cylinder combustion zone, and an indirect water-cooling of the lower end of the cylinder about the exhaust port zone thereof. By this method of cylinder cooling, there is attained a more uniform rate of heat absorption throughout the cylinder, thereby providing for a more uniform liner expansion and a substantially even heat distribution throughout the liner structure. In all other respects the improved cylinder assembly fully attains the objects and advantages hereinabove stated. It is to be noted particularly, that the liner and exhaust collector water jackets are not formed in any part, by the engine frame structure. Hence, the engine cooling water does not come into contact with any portion of the engine frame nor any stress member thereof, so that corrosive damage to the frame elements, or rusting of the liner and collector member to the frame is precluded. Also, it is to be emphasized as an important feature of the present invention, that as a result of the improved cylinder structure, there is obviated any need for water-sealing gaskets in association with the cylinder jacket, such as obtains in older prevailing engine cylinder jacket systems.

It is to be understood that the present description relates primarily to a preferred embodiment of the invention, and that alterations or modifications in the cylinder structure and its assembly relation to the engine may be effected within the full intended scope of the invention, as defined by the appended claims.

We claim:

1. The described method of cooling a cylinder structure for an internal combustion engine of the type described, wherein the cylinder is subjected to differing degrees of heat in a plurality of zones thereof, which consists in direct water-cooling of one cylinder zone, in less direct water-cooling of another cylinder zone, and in air-cooling a third cylinder zone.

2. The described method of cooling a cylinder structure for an internal combustion engine of the type described, wherein the cylinder is subjected to differing degrees of heat in a plurality of zones thereof, which consists in direct water-cooling of the cylinder zone of greatest heat, in less direct water-cooling of a cylinder zone subjected to a lower degree of heat, and in air-cooling another cylinder zone subjected to a degree of heat less than that in the zone of greatest heat.

3. The described method of cooling a cylinder structure for an internal combustion engine of the type described, wherein the cylinder is subjected to differing degrees of heat in a plurality of zones thereof, which consists in direct water-cooling of the cylinder zone of greatest heat by a high velocity water flow, in less direct water-cooling of another cylinder zone subjected to a lower degree of heat, and in air-cooling a third cylinder zone subjected to a lower degree of heat, by the scavenging air supplied to the cylinder.

4. The described method of cooling a cylinder structure for an internal combustion engine of the type described, wherein the cylinder is subjected to differing degrees of heat in a plurality of zones thereof, which consists in direct water cooling of the cylinder zone of greatest heat, in less direct water cooling of another cylinder zone subjected to a lower degree of heat, and in cooling a third cylinder zone subjected to a lower degree of heat, through the agency of the piston operating in the cylinder in such zone.

5. The described method of cooling a cylinder structure for an internal combustion engine of the type described, wherein the cylinder is subjected to differing degrees of heat in a plurality of zones thereof, which consists in direct water cooling of the cylinder zone of greatest heat, in less direct water cooling of another cylinder zone subjected to a lower degree of heat, and in cooling a third cylinder zone subjected to a lower degree of heat, through the combined agencies of the piston operating in the cylinder in such zone and the scavenging air supplied to the cylinder.

6. In an internal combustion engine of the type described, an engine frame, a cylinder liner separate from and removably carried by the frame and characterized by an intermediate section providing a combustion zone, an end section containing scavenging air ports, and an opposite end section containing exhaust ports, means cooperating with said liner section at the combustion zone, to form a water jacket providing for a substantially direct water-cooling of the said intermediate liner section, means cooperating with said liner air port containing section, providing for direct air-cooling of said liner section, and jacketed means cooperating with said liner exhaust port containing section to provide for indirect water-cooling of said exhaust port section.

7. In an internal combustion engine of the type described, an engine frame, a cylinder liner removably carried by the frame and characterized by a liner portion intermediate its ends providing a combustion zone and a liner end portion containing scavenging air ports, partition elements formed externally on said liner portion providing the combustion zone and directed angularly about said liner portion, a member sleeved on the liner and cooperating with said partition elements to form a water jacket providing for direct water-cooling of said liner portion defining the combustion zone, and means cooperating with said liner end portion containing said air ports, providing for direct air-cooling of said liner portion, said means including projections on said liner end portion.

8. In an internal combustion engine of the type described, an engine frame, a cylinder structure supported by the frame, said structure including a cylinder liner and a member assembled to a portion of said liner, said member cooperating with the liner to form a water jacket about said liner portion, said liner being provided with scavenging air ports, a plurality of projections or fins on the liner adjacent said air ports, and means associated with said engine frame and liner, serving to conduct scavenging air from a source of supply thereof, about said fins and to said air ports.

9. In an internal combustion engine of the type described, an engine frame, a cylinder structure supported by the frame, said structure including a cylinder liner and a member arranged about a portion of said liner, said member cooperating with the liner to form a water jacket about the liner, providing for a substantially direct water-cooling of the said liner portion, said liner being provided with scavenging air ports, a plurality of projections or fins on the liner adjacent said air ports, means associated with said engine frame and liner, serving to conduct scavenging air from a source of supply thereof, about said fins and to said air ports, said liner also being provided with exhaust discharge ports, and a water-jacketed member arranged about said liner at the zone of said exhaust ports, providing for an indirect water-cooling of said liner at the exhaust port zone thereof.

10. In an internal combustion engine of the type described, an engine frame, a cylinder assembly supported by the frame, said assembly including a cylinder liner characterized by a combustion zone, an exhaust port zone including exhaust ports and a scavenging air port zone including air ports, means cooperating with said liner to form a water jacket about the liner combustion zone, providing for a substantially direct water-cooling of the said liner zone, means for conducting scavenging air from a source of supply into heat exchange contact with the liner in said air port zone, and thence to said air ports, and a water jacketed, exhaust discharge device arranged about said exhaust port zone of the liner and having exhaust discharge communication with said exhaust ports, said jacketed device providing for indirect water-cooling of the liner exhaust port zone.

11. In an internal combustion engine of the type described, an engine frame, a cylinder structure removably supported by the frame, said structure including a cylinder element characterized by a combustion zone intermediate its ends, scavenging air ports adjacent one end and exhaust discharge ports adjacent the opposite end thereof, an element sleeved on said cylinder element about said combustion zone, one of said elements being provided with spaced projections or ribs, said elements and said ribs cooperating in assembly, to form passages constituting a water-jacket for the circulation of liner cooling water therethrough, means on said engine frame, provided for conducting scavenging air from a source of supply thereof, into heat exchange contact with the air port end of said liner and thence to said air ports, and means associated with said exhaust ports for the discharge of exhaust gases therefrom.

12. A cylinder structure for an internal combustion engine of the type described, comprising a cylinder liner characterized by a combustion zone intermediate its ends, scavenging air ports in one end portion and exhaust ports in the opposite end portion, the liner wall portion defining said combustion zone, having formed in the external surface thereof between said air and exhaust ports, a plurality of channels certain of which are of spiral trend circumferentially of the said wall portion, a member sleeved on said liner and cooperating with said channels to form passages constituting a liner jacket for the circulation of liner cooling water therethrough, and a water-jacketed exhaust discharge conduit arranged on the exhaust port end of the liner in exhaust discharge communication with said exhaust ports, said jacketed conduit having its jacket space in circuit with said liner jacket passages, for the circulation of cooling water therebetween, whereby to provide for direct water-cooling of the combustion zone and indirect water-cooling of the exhaust port zone of said liner.

13. A cylinder structure for an internal combustion engine of the type described, comprising a cylinder liner characterized by a combustion zone intermediate its ends, said liner having a plurality of channels formed in the outer periphery of the liner wall portion defining the liner combustion zone, said channels extending generally in a spiral direction about said liner wall portion, and a member sleeved on the liner and coacting with said liner channels to form passages constituting a fluid-jacket for the circulation of a liner cooling fluid therethrough.

14. A cylinder structure for an internal combustion engine of the type described, comprising a cylinder liner characterized by a combustion zone intermediate its ends, said liner having a plurality of channels formed in the outer periphery of the liner wall portion defining the liner combustion zone, said channels being extended in a spiral direction about said liner wall portion, a member sleeved on the liner and coacting with said liner channels to form passages constituting a fluid-jacket for the circulation of a liner cooling fluid therethrough, said liner also being provided with scavenging air inlet ports near one end thereof, and air-cooling projections or fins on said liner end, adjacent said air ports.

15. A cylinder structure for an internal combustion engine of the type described, comprising a cylinder liner characterized by a combustion zone intermediate its ends, said liner having a plurality of channels formed in the outer periphery of the liner wall portion defining the liner combustion zone, certain of said channels being of a tortuous trend and extending generally in a spiral direction about said liner wall portion, and a tubular member sleeved on the liner and coacting with said liner channels to form passages constituting a fluid-jacket for the circulation of a liner cooling fluid therethrough, said member being adapted for a press-fit thereof upon the liner, in a manner to provide for a fluid-tight liner jacket.

16. In an internal combustion engine of opposed piston type, characterized by upper and lower crankshafts, a cylinder assembly for a pair of pistons operating in opposed relation therein and connected respectively, to the upper and lower crankshafts, said cylinder assembly comprising a cylinder liner characterized by a combustion zone intermediate its ends, and provided with air ports near one end and exhaust discharge ports near the opposite end, said liner having channels formed in the external periphery thereof, about said combustion zone, certain of the channels being of a tortuous trend and extended generally in a spiral direction about said liner zone, a tubular member sleeved on said liner over the combustion zone thereof, and cooperating with the said channels to form passages constituting a jacket about the liner combustion zone, through which a liner cooling fluid may be circulated for cooling such zone of the liner, a separate, jacketed exhaust collector member operatively associated with said liner on the end thereof containing said exhaust ports, said member having exhaust discharge passages in communication with said exhaust ports, means for conducting a cooling fluid to the jacket space of said member and thence to said liner jacket, whereby through said jacketed member and liner jacket, the liner combustion zone and the exhaust port zone thereof may be effectively cooled, and means for cooling the end portion or zone of the liner containing said air ports, said means being constituted in part by the piston operating in such zone of the liner.

17. In an internal combustion engine of the type described, an engine frame, a cylinder liner structure separate from and removably supported by, the engine frame, said structure including a water-jacket about a portion of the liner, providing for a substantially direct water-cooling of the said liner portion, said liner having exhaust ports in one end portion thereof, a separate water-jacketed, exhaust discharge member removably supported by the engine frame, extending about said liner end portion, including the zone of said exhaust ports, and having exhaust discharge communication with said ports, said jacketed member providing for indirect water-cooling of said liner end portion and exhaust port zone, and a jacket-water circulation connection between said jacketed member and said liner jacket.

18. In an internal combustion engine of the type described, an engine frame, a cylinder assembly separate from and removably supported by the frame, said cylinder assembly including a cylinder liner and an element sleeved over a portion of the liner and retained thereon by a press fit with said liner portion, said element cooperating with said liner portion to form a liner water jacket, providing for a substantially direct water-cooling of the said liner portion, said liner being provided with exhaust discharge ports in an end portion thereof, a separate water-jacketed exhaust discharge member removably supported by the engine frame, extending about said liner end portion, including the zone of said exhaust ports, and having exhaust discharge communication with said ports, said jacketed member providing for indirect water-cooling of said liner end portion and exhaust port zone, and a jacket-water circulation connection between said jacketed member and said liner jacket.

ANKER K. ANTONSEN.
HANS DAVIDS.